(12) United States Patent
Satish (10) Patent No.: US 8,205,239 B1
(45) Date of Patent: Jun. 19, 2012

(54) METHODS AND SYSTEMS FOR ADAPTIVELY SETTING NETWORK SECURITY POLICIES

(75) Inventor: Sourabh Satish, Fremont, CA (US)

(73) Assignee: Symantec Corporation, Mountain View, CA (US)

(*) Notice: Subject to any disclaimer, the term of this patent is extended or adjusted under 35 U.S.C. 154(b) by 1054 days.

(21) Appl. No.: 11/864,951

(22) Filed: Sep. 29, 2007

(51) Int. Cl.
*G06F 17/00* (2006.01)
*H04L 29/06* (2006.01)

(52) U.S. Cl. ......... 726/1; 726/2; 726/3; 726/11; 726/12; 726/27; 726/28; 726/29

(58) Field of Classification Search .............. 726/22–25, 726/27–29, 1–4, 6, 11–13
See application file for complete search history.

(56) References Cited

U.S. PATENT DOCUMENTS

| | | | | |
|---|---|---|---|---|
| 7,209,895 B2* | 4/2007 | Kundtz et al. | | 705/26 |
| 7,849,502 B1* | 12/2010 | Bloch et al. | | 726/11 |
| 2001/0005890 A1* | 6/2001 | Nitaki | | 713/202 |
| 2005/0015330 A1* | 1/2005 | Beery et al. | | 705/38 |
| 2006/0095422 A1* | 5/2006 | Kikuchi | | 707/3 |
| 2006/0225136 A1* | 10/2006 | Rounthwaite et al. | | 726/26 |
| 2007/0041517 A1* | 2/2007 | Clarke et al. | | 379/67.1 |
| 2008/0005223 A1* | 1/2008 | Flake et al. | | 709/203 |
| 2008/0022384 A1* | 1/2008 | Yee et al. | | 726/11 |
| 2008/0028444 A1* | 1/2008 | Loesch et al. | | 726/4 |
| 2009/0282476 A1* | 11/2009 | Nachenberg et al. | | 726/22 |
| 2009/0328209 A1* | 12/2009 | Nachenberg | | 726/22 |
| 2010/0077445 A1* | 3/2010 | Schneider et al. | | 726/1 |
| 2010/0153530 A1* | 6/2010 | Erickson et al. | | 709/223 |

* cited by examiner

*Primary Examiner* — Eleni Shiferaw
*Assistant Examiner* — Jing Sims
(74) *Attorney, Agent, or Firm* — Holland & Hart LLP (57) ABSTRACT

Determining a security policy to apply to access requests to network sites that have not been classified for security risks is accomplished according to user behavior. Past behavior of users and requests to access network sites that are known security risks is recorded. When a user requests access to a site that is not classified for security purposes, a security policy is selected based on one or more users' past behavior. When a user has a history of not accessing sites that pose security risks, a more permissive security policy is set, and when a user has a history of requesting access to sites that do pose security risks a more restrictive security policy is set. Access requests are tracked, and security policy may be set at a name server that is remote from a user or user's computing system.

15 Claims, 10 Drawing Sheets

METHODS AND SYSTEMS FOR ADAPTIVELY SETTING NETWORK SECURITY POLICIES

FIELD

The present invention is related to accessing network sites through an access gateway and, more specifically, to adaptive setting of security policies for the access of network sites based on prior behavior of one or more users.

BACKGROUND

Computing system and computing network security includes a number of aspects, including, for example, monitoring application programs that a computing system attempts to run, monitoring messages received at a computing system, and monitoring network sites that a computing system attempts to access. In the event that such monitoring reveals a potential security risk, access to the application, message, or site may be preceded by a warning, or may be denied entirely, based on the level of perceived risk. Risk may be determined by any of a number of factors, and may be based on the likelihood that a computing system may be used in an undesired manner if access is allowed to the potential security risk. In order to reduce the likelihood that a system is used in an undesired manner, systems often have security software that operates to monitor activity of the system and provide warnings or preclude access to undesirable content. In a network setting, each client system of the network often has such security software installed, along with other network components such as servers, routers, and the like.

In an enterprise setting, where a computing network may include many systems across a number of different enterprise sites, computer and network security is also important. Many enterprises require that data on the enterprise network be secure, and that components of the enterprise network are not used in an undesirable manner. For example, a computer virus may infect an enterprise network resulting in network components such as client computers, servers, routers, and the like to malfunction. Such an event may result in a significant loss of productivity, and a significant expenditure of resources in order to recover from the malfunction(s) caused by the virus. Also, in some cases, such an event may result in confidential or valuable data being lost or accessed by an unauthorized party. As mentioned, security software installed in various network components reduces the chances that such an event occurs, however, such software may not identify a threat before it is too late, and a system, or network, is infected.

As mentioned, in an enterprise setting, numerous network components are often interconnected to an enterprise network across multiple enterprise sites. Management of such network components is often a difficult task, simply due to the relatively large number of systems and software applications that are present. In many enterprise settings, software installation and updates to individual client systems can be a burdensome task, and thus it is often desired to reduce such events to that extent that such reduction is possible. For this reason, many enterprises, to the extent possible, desire to have applications installed on servers or other more centralized network components, rather than individual client systems. Such installations reduce the number of applications running on client systems, thereby increasing the performance of the client systems for the end users, and also reduces the need to push software installations and updates to the client systems.

SUMMARY

Embodiments disclosed herein provide systems and methods for determining a security policy to apply to access requests to network sites that have not been classified for security risks. Past behavior of users and requests to access network sites that are known security risks is recorded. When a user requests access to a site that is not classified for security purposes, a security policy is selected based on one or more users' past behavior. When a user has a history of not accessing sites that pose security risks, a more permissive security policy is set, and when a user has a history of requesting access to sites that do pose security risks a more restrictive security policy is set. Access requests are tracked, and security policy may be set at a name server that is remote from a user or user's computing system.

In one aspect, a network access gateway is provided. The access gateway includes a network interface that receives requests to access a network site from one or more users that are remote to the network access gateway. The gateway also includes a memory that stores user information related to security risks of network sites to which a particular user has previously requested access, and a processor accesses the memory and, based on the user information, selects a security profile that is to be applied to the access request. The memory may include a database of access requests from a plurality of users and information related to the security risks of network sites to which each user has previously requested access, and the database may include a score for each user based on a number of access requests to network sites that have been identified as security risks. When the access request is for a network site of unknown security risk, the processor may select the security profile based on a security reputation of other users that have requested access to the network site, and when the frequency of access requests to network sites that are identified as security risks is relatively high, access to network sites of unknown security risks is restricted. The processor may also generate a notification when a predetermined number of access requests are received for a network site that is not classified for security risk.

In another aspect, the present disclosure provides a method for selecting a security profile to apply to a request to access a network site. The method of this aspect includes receiving an access request to access a network site from a remote computing system, identifying a user ID associated with the access request, and determining if the network site has been classified according to a security risk for the site. When the network site has been classified, the user ID, network site, and security risk are recorded in a memory. When the network site has not been classified, a security profile for the network site is identified based on prior access requests associated with the user ID. Identifying a user ID may include determining a network address of the remote computing system, and identifying the user ID of a user actively logged on to the remote computing system for that instance of the network address. Determining if the network site has been classified may comprise identifying a network address of the network site, accessing a memory of classified network sites, and determining if the identified network address has been classified. When the identified network address is not classified for security purposes, it may be determined that the network address is not a potential security risk when prior access requests associated with the user ID have not requested access to network sites that are security risks. Recording the user ID, network site, and security risk may comprise accessing a database that contains records of user IDs, access requests made by the user ID, and security risks associated with the access requests; and updating the database record for the user ID with the access request and security risk. When the network site has not been classified, the security profile may be identified based on prior access requests associated with the user ID and prior access requests by other users for the network site.

DETAILED DESCRIPTION

For a more complete understanding of this invention, reference is now made to the following detailed description of several embodiments as illustrated in the drawing figures, in which like numbers represent the same or similar elements. Various embodiments are described herein, with specific examples provided in many instances to serve to illustrate and discuss various concepts included in the present disclosure. The specific embodiments and examples provided are not necessarily to be construed as preferred or advantageous over other embodiments and/or examples.

As discussed above, network security is a concern and priority for many, if not all, enterprise networks, as well as smaller networks and individual personal users. The present disclosure recognizes that in certain cases, security software may not recognize a security threat, perhaps because the threat is relatively new and the security software has not been updated to recognize the threat. In such cases, the actions of a user determine whether the threat actually materializes into a security problem, such as an infection by a virus or other undesired use of a computing system or network. Many current methods involve software that operates on individual network clients to monitor activity on that particular client, and identify known risks related to the monitored activity. Such methods are successful in identifying and thereby avoiding many risks, however, as discussed above, such methods are capable of only identifying known risks, and unknown risks are therefore still possible. Various embodiments of the present disclosure provide methods, systems, and apparatuses that enable a more centralized monitoring for requests to access network sites that are remote from the computer that is requesting access, such as Internet websites. In the event that access is requested for a site that has not been classified as being or security risk or not being a security risk, prior behavior of the system user, and prior behavior of other users, may be used to determine whether the site has a likelihood of presenting a security risk.

As used herein, a "computing system" is used generically to refer to a computer that is primarily accessed and used by an individual user of a network, or a personal computer of an individual. Such a computing system may be a standalone computer, such as a personal computer, laptop, handheld computer, or a wireless device that may be used to access remote sites through a network. Also, as used herein, a "computing network" is used to refer to a network that is interconnected with a number of computing systems that may be a local area network (LAN), a wide area network (WAN), or other type of network, that may be interconnected by wire or fiber connections, wireless connections, or combinations thereof. Such a network may include combinations of one or more of a WAN such as the Internet, enterprise intranets, LANs, and/or personal area networks (PANs), for example.

Figure 1:
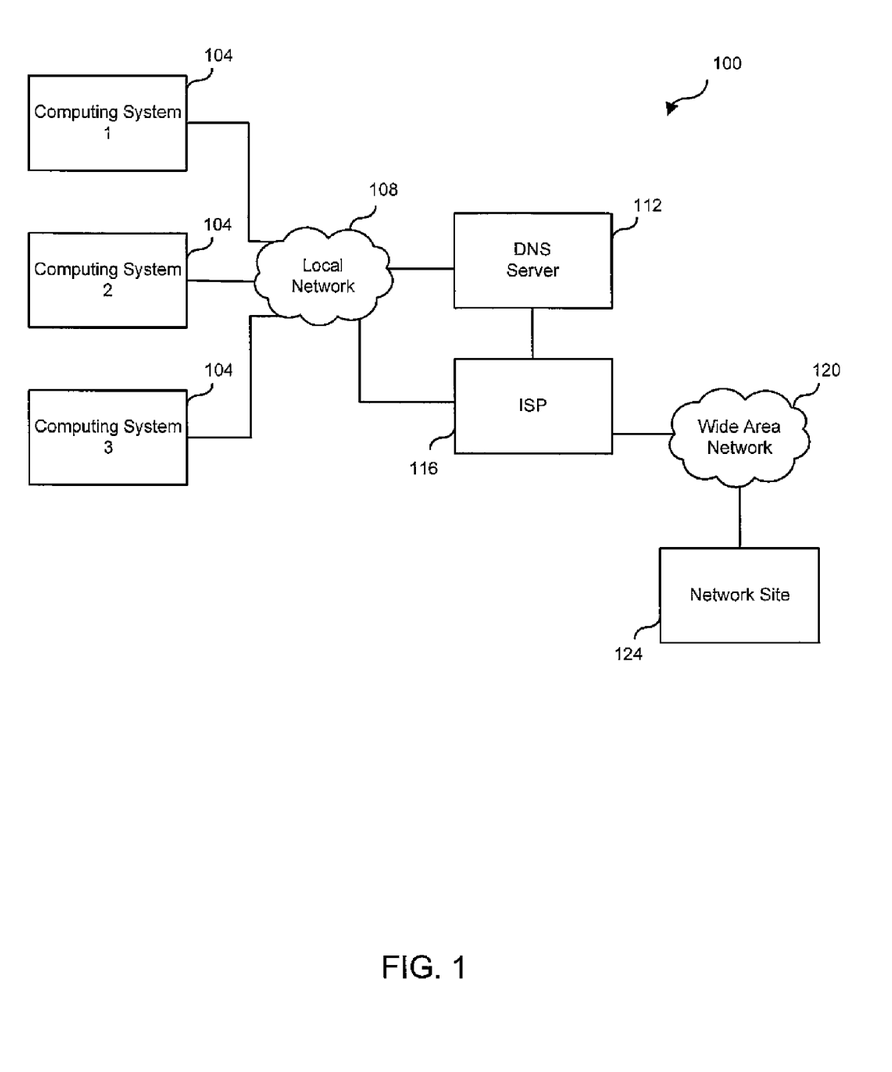
FIG. 1 is a functional block diagram of an exemplary computing network.

With reference now to FIG. 1, an exemplary computing network 100 is illustrated for an embodiment. The network 100 includes a number of computing systems 104. Such computing systems 104 may include network clients used by end users to perform various computing tasks, such as day to day computing tasks of word processing, data entry and analysis, communications such as email, and remote site access such as Internet browsing, to name but a few examples. These computing systems, as mentioned above, may include personal computers, handheld devices, wireless devices, and combinations thereof. The computing systems 104 are interconnected to a local network 108, such as a LAN. Various other network components are also interconnected to the local network 108, including a name server 112 and a remote network gateway 116. It will be understood that numerous other network components also may be coupled to the local network 108 that are not illustrated in FIG. 1, such as storage servers, database servers, and email servers, to name but a few. Such other network components are not illustrated here in order to provide a more clear and concise discussion of this exemplary embodiment, although it will be readily understood by one of skill in the art that the illustrated computing network 100 may include such various other network components. In this embodiment, a user of a computing system 104 may request access through a wide area network 120 to a network site 124. For example, a user of a computing system 140 may desire to access an Internet website, and attempts to do so by entering a website address into an Internet browser application that is executing on the user's computing system 104. The browser application takes this information and accesses the name server 112 that resolves a physical network address for the requested network site 124. In one embodiment, the name server 112 is a DNS server that resolves the name of the website typed into the browser with the Internet Protocol (IP) address of the network site 124 that will send the requested information from that website. After the name server 112 has provided the network address, the user's computing system 104 accesses the remote network gateway 116, which provides access to the network site 124 through the wide area network 120. Continuing with the above example, after the IP address is resolved by the name server 112, the remote network gateway 116, which may be an Internet service provider (ISP) or web server, requests access to the network site 124 through the wide area network 120.

As will be described, in various embodiments, the name server 112 monitors and records the various access requests made by users of computing systems 104 and may adaptively adjust security policies that are applied to access requests based on the recorded activity. In such a manner, security policies may be applied to access requests to remote network sites 124 at a point other than at the particular computing system 104 that generates the access request. Thus, there is not a requirement for additional software applications to be executed at a user's computing system 104 that are used to apply security policies relative to the access requests. This also provides for updating of the security software at the name server 112, which is then applied to any access requests in the future, rather than having to update a software application at each computing system 104. Furthermore, monitoring at the name server 112 allows behavior of different users to be used in determining security policy that is to be applied to different network sites 124. For example, in an embodiment, the name server 112 monitors access requests for each user, and records whether the access requests are related to network sites 124 that have good or bad reputations relative to network security. A network site 124 may be identified as having a bad reputation, and access to the site may be restricted, if the site is known to have undesirable content. A security company may monitor network sites 124, and periodically provide updates to the name server 112 related to the reputation for network sites 124, that the name server 112 then uses when recording information relative to access requests received from a user of a computing system 104. In the even that an access request is received for a network site 124 that has not yet been classified by the security company, the name server 112 may determine a reputation for the user that is requesting access that is based on the number of bad network sites 124 as compared to the number of good network sites 124 that the user has requested access to in the past. When the user has a low proportion of bad to good access requests, the name server 112 determines that the likelihood of that user to access bad sites in low, and may allow access to the requested network site 124. In the event that the user has a relatively high proportion of bad access requests, the name server 112 may determine that the user has a propensity to request access to bad network sites 124, and may therefore prohibit access to the requested network site. The name server 112 may also determine that a number of access requests for a network site 124 have been made by more than one user, and a security policy for the requested site may be set based on the collective reputations of the users that have requested access. The operation of the name server 112 when making such determinations will be described in more detail below for a number of exemplary embodiments.

Figure 2:
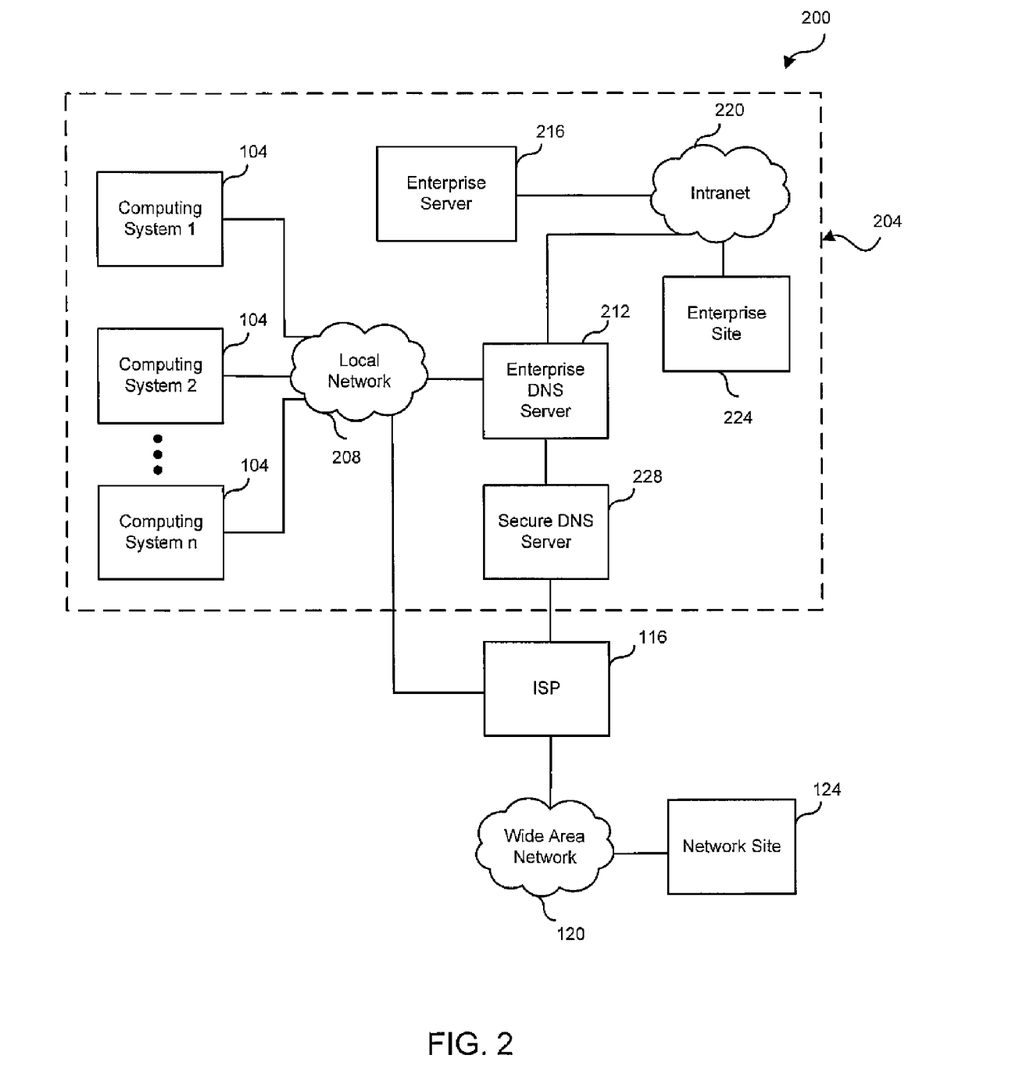
FIG. 2 is a functional block diagram of another exemplary computing network.

With reference now to FIG. 2, an exemplary computing network 200 is illustrated for another embodiment. In this embodiment, an enterprise network 204 includes a number of computing systems 104, that are coupled to a local network 208. The local network 208 is coupled to a number of other network components, including an enterprise name server 212 and enterprise server 216. Similarly as discussed above, the local network 208 may be coupled to various other network components as well. The enterprise network 204 also includes an intranet 220, and one or more enterprise sites 224. In this embodiment, when a user of a computing system 104 requests access to a site remote from the computing system 104, such as by entering a web address into a browser application, the enterprise name server 212 determines whether the requested site is an enterprise site 224 or a network site 124 that is external to the enterprise network 204. In the event that the request is for an enterprise site 224, access is granted and the enterprise name server 212 provides the network address for the enterprise site 224, which is accessed through enterprise server 216. If the enterprise name server 212 determines that the access request is for a site that is not an enterprise site, the request is forwarded to secure name server 228, that operates in a similar manner as described with respect to name server 112 of FIG. 1. The enterprise network 204 is coupled to a remote network server 116, wide area network 120, and network sites 124, each of which are described with respect to FIG. 1 and operate in similar fashion when coupled to enterprise network 204. In such a manner, the secure name server 228 does not receive requests that are related to enterprise sites 224 that are presumed to have no security risks.

Figure 3:
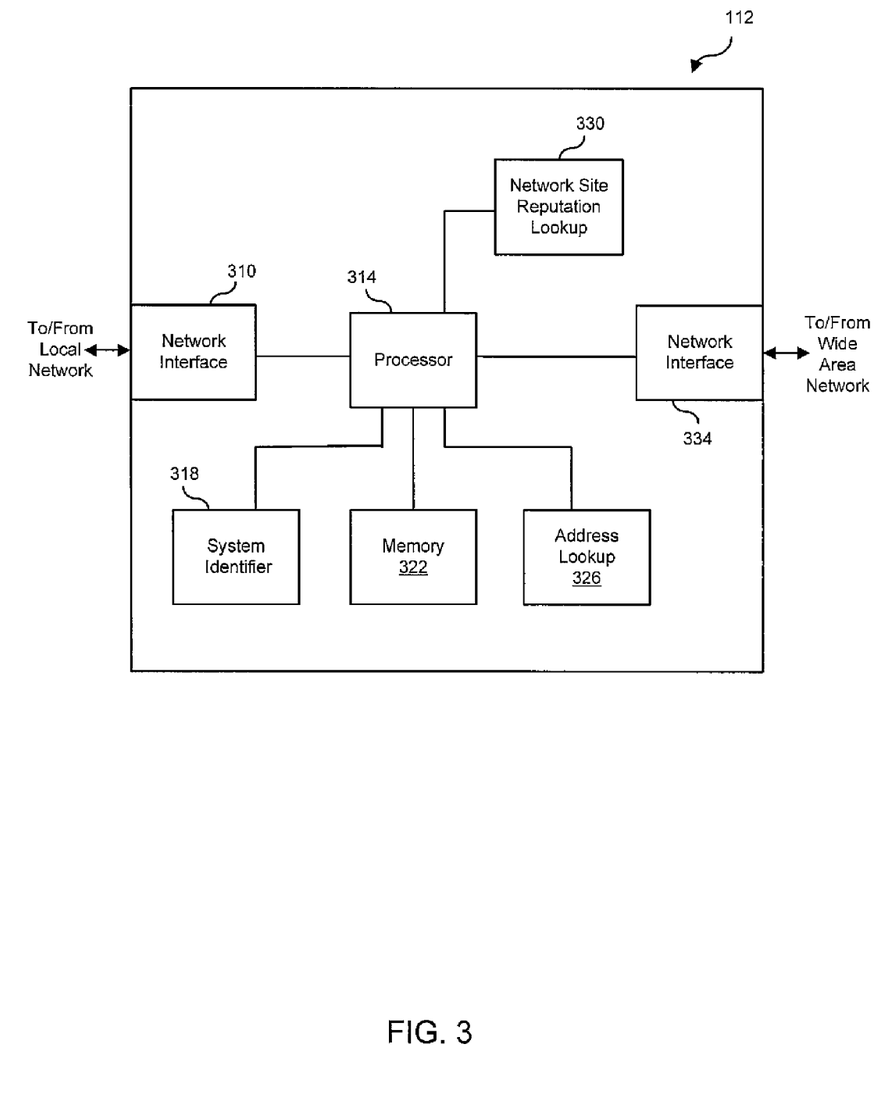
FIG. 3 is a functional block diagram of an exemplary name server.

Referring now to FIG. 3, a functional block diagram illustration of a name server 112 is described for an exemplary embodiment. The name server 112 in this embodiment includes a network interface 310 that sends/receives data to/from the local network. The network interface 310 is coupled to a processor 314 that performs processing and computing tasks for the name server 112. The processor 314 is coupled to a number of different components, including system identifier 318, memory 322, address lookup 326, and network site reputation lookup 330. The processor 314 is also connected to another network interface 334 that sends/receives data to/from a wide area network. The components coupled to the processor 314 operate to perform various different functions. The system identifier 318, in this embodiment, operates to identify the computing system that the name server 112 is communicating with for any given communication and access request. The system identifier 318 may determine an identification of a computing system and/or the identification of a user that generates an access request. Memory 322 is used to store information related to network sites, computer systems, and/or users, that is used to determine a security policy that is to be applied to certain access requests, and information related to a particular user or system that may be used to determine a likelihood of a security risk for an access request. For example, if an access request is received for a particular network site, the memory may include information related to that particular site that indicated that access to the site is to be prohibited because the site contains content that is deemed to be a security risk due to the undesirable nature of the content. Such information, and the determination of particular security policies, will be described in more detail below. The memory 322 may include any type of volatile memory, nonvolatile memory, or combinations thereof. While illustrated as internal to the name server 112, the memory 322 may also be coupled to external memory, such as a storage server or database server that is interconnected with the local network through the network interface 310, with information related to users, systems, and/or network sites stored in the external memory. The address lookup 326 provides a physical network address for a particular access request. The physical network address may be stored in the memory 322, or the address lookup 326 may transmit an inquiry through the processor 314 and network interface 334 to determine a physical address for a particular access request. The network site reputation lookup 330 operates to determine a reputation for the requested network site, and may communicate with a security company through the processor 314 and network interface 334 to determine a network site reputation. The network site reputation may be good, indicating that there have been no recorded incidences of the particular site including content that is not desirable, bad, indicating that there have been incidences of the site including undesirable content. In some embodiments, a network site may also be classified as a potential security risk, indicating that a site may contain undesirable content, which may prompt a warning to the user to exercise caution when accessing the site. The processor 314 may perform operations that determine a likelihood of a security threat, and may determine a security policy based on such a likelihood. Such operations will be described in more detail below.

Figure 4:
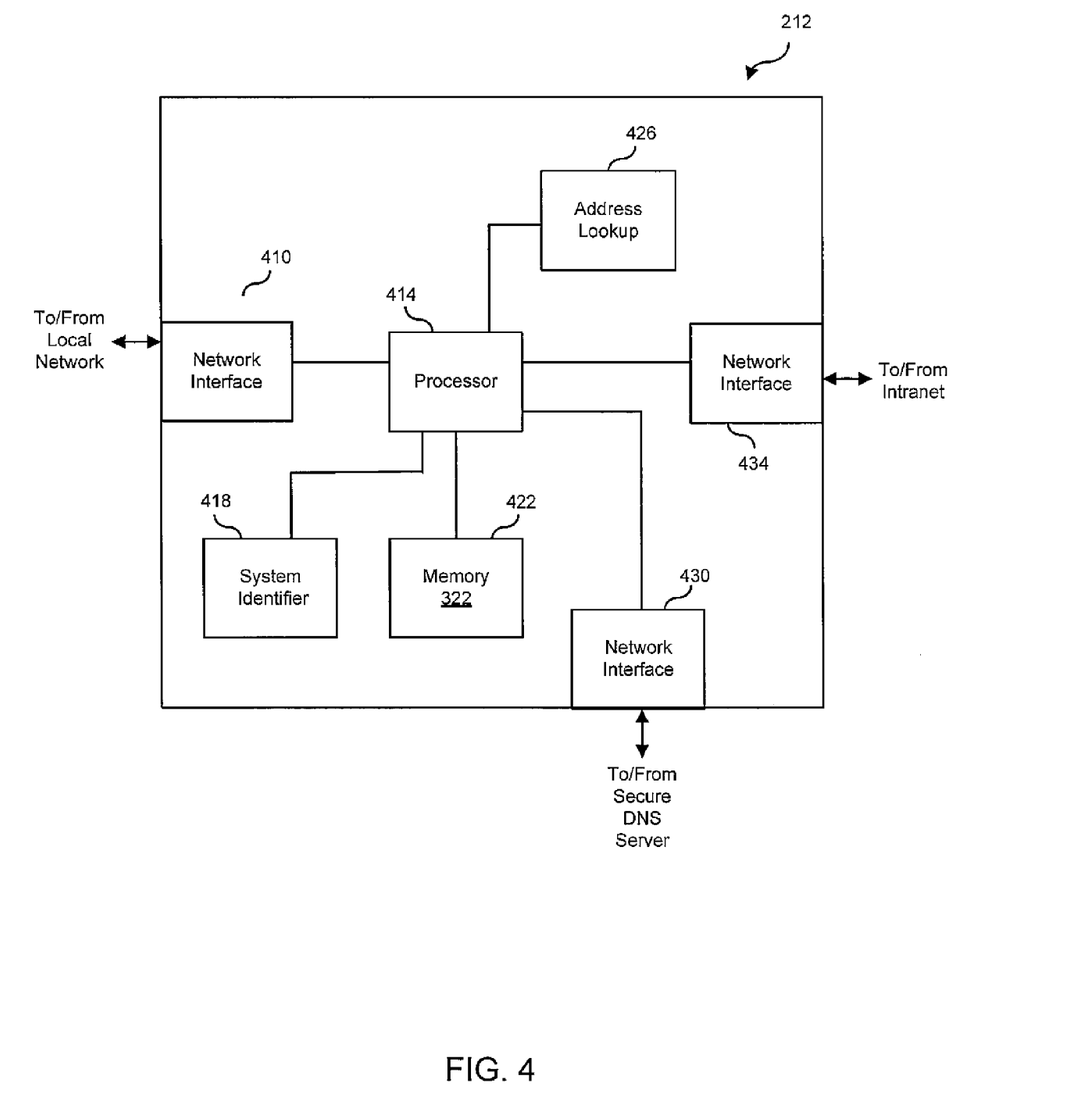
FIG. 4 is a functional block diagram of another exemplary name server.

Referring now to FIG. 4, a functional block diagram of an enterprise name server 212 is described for an exemplary embodiment. In this embodiment, the enterprise name server includes a network interface 410 that sends/receives data to/from a local network. A processor 414 is interconnected with a number of components, including a system identifier 418, a memory 422, and an address lookup 426, that perform functions similarly as described above with respect to FIG. 3. The system identifier 418 may determine an identification of a computing system and/or the identification of a user that generates an access request. Memory 422 is used to store information related to network sites, computer systems, and/or users, that are associated with the enterprise. If a user requests access to an enterprise site, the enterprise name server 212 may determine a security policy that is to be applied to access request as having no restrictions on access, because the enterprise sites are presumed to include no undesirable content. In one embodiment, the memory 422 includes information related to enterprise sites, but not information related to network sites that are external to the enterprise. The memory 422 may include any type of volatile memory, nonvolatile memory, or combinations thereof. While illustrated as internal to the enterprise name server 212, the memory 422 may also be coupled to external memory, such as a storage server or database server that is interconnected with the local network through the network interface 410, with information related to users, systems, and/or network sites stored in the external memory. The address lookup 426 provides a physical network address within the enterprise network for a particular access request. The physical network address may be stored in the memory 422, or the address lookup 426 may transmit an inquiry through the processor 414 and network interface 434 to determine a physical address for a particular access request. Network interface 430 sends/receives data to/from an enterprise intranet in this embodiment. The processor is also coupled to a network interface 430, that sends/receives data to/from a secure name server, which will be described in additional detail below. In an embodiment, the processor 414 forwards access requests to the secure name server when it is determined that the access request is not directed to an enterprise site.

Figure 5:
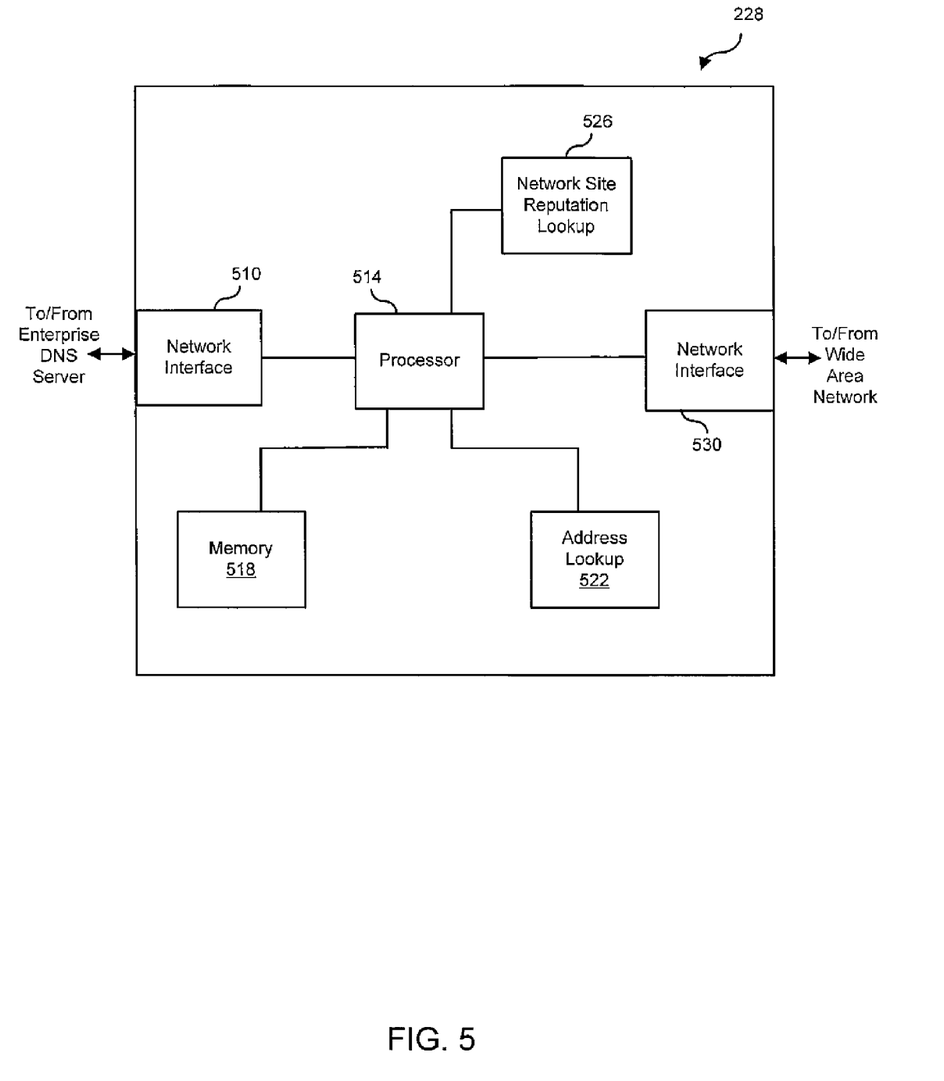
FIG. 5 is a functional block diagram of another exemplary name server.

With reference now to FIG. 5, a functional block diagram of a secure name server 228 is described for an exemplary embodiment. In this embodiment, the secure name server 228 includes a network interface 510 that sends/receives data to/from an enterprise server, such as described above with respect to FIG. 3. The network interface 510 is coupled to a processor 514, that is in turn coupled to a number of different components, including a memory 518, address lookup 522, and network site reputation lookup 526. The processor 514 is also interconnected with another network interface 530 that sends/receives data to/from a wide area network. Processor 514 performs processing and computing tasks for the secure name server 228. The components coupled to the processor 514 operate to perform various different functions. Memory 518 is used to store information related to network sites, computer systems, and/or users, that is used to determine a security policy that is to be applied to certain access requests, and information related to a particular user or system that may be used to determine a likelihood of a security risk for an access request. In other embodiments, the secure name server 228 simply transmits requested information to the enterprise name server 212 through network interface 510, and the enterprise name server performs tasks related to likelihood of a security risk and a security policy to apply to an access request. The memory 518 may include any type of volatile memory, nonvolatile memory, or combinations thereof. While illustrated as internal to the name server 228, the memory 518 may also be coupled to external memory, such as a storage server or database server that is interconnected through the enterprise name server through the network interface 310, with information related to users, systems, and/or network sites stored in the external memory. The address lookup 522 provides a physical network address for a particular access request. The physical network address may be stored in the memory 518, or the address lookup 522 may transmit an inquiry through the processor 514 and network interface 530 to determine a physical address for a particular access request. The network site reputation lookup 526 operates to determine a reputation for the requested network site, and may communicate with a security company through the processor 514 and network interface 530 to determine a network site reputation. In other embodiments, the secure name server 228 passes network address information to the enterprise name server that determines a reputation of a the requested network site. Network site reputation may be determined as described above, or as described in additional detail for various embodiments below.

Figure 6:
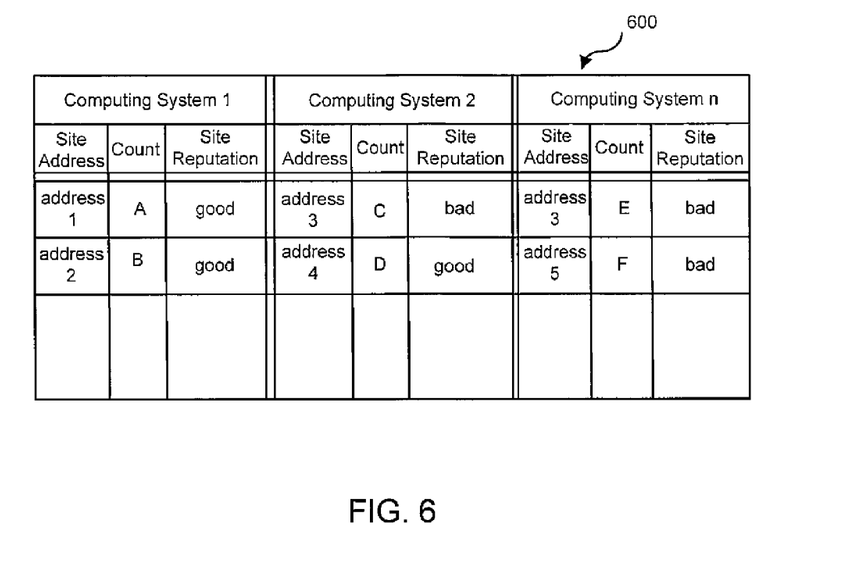
FIG. 6 is an example of a table containing information related to users and associated access requests.

Referring now to FIG. 6, a table 600 is illustrated for an exemplary embodiment that includes information related to users and access requests generated by the users. In this embodiment, a number of pieces of information are collected related to a particular user. For example, for each of USER(1) through USER(n) information related to site addresses is recorded, a number of times the user has attempted to access a site address is recorded, and a reputation for the site is recorded. In such a manner, the behavior of a particular user may be tracked, and patterns observed that may then be used to provide input to the determination of a security policy to be applied for the user in the future. Table 600 may be stored on a name server, in a storage server or database server that is coupled to a name server (such as through a local network), or on a computing system that the user accesses the network through. In the event that the table 600 is not stored in the memory of a name server, information from the table 600 may be provided to the name server upon request. While data is illustrated in FIG. 6 as being related to a particular user, such as identified by a user ID that the user uses when logging into a computing system, such data may also be associated with a particular computing system, or a particular network address. Furthermore, network addresses for particular computing systems may be dynamically assigned by a network when the system is started up and a user logs on to the network. In such cases, the user may be identified by using, for example, an active directory that includes information related to a computing system, the dynamically assigned network address for the computing system, and the identification of the user that is logged on to the computing system. Additionally, it is to be understood that the table 600 of FIG. 6 is provided for the purposes of illustration and discussion only, and the information stored in the table 600 may be stored in any of a number of different formats and/or structures as will be readily understood by one of skill in the art. Furthermore, other formats and/or structures may include different, additional, or less information than stored in table 600, so long as sufficient information is stored to provide historical behavior of a particular user or system.

Figure 7:
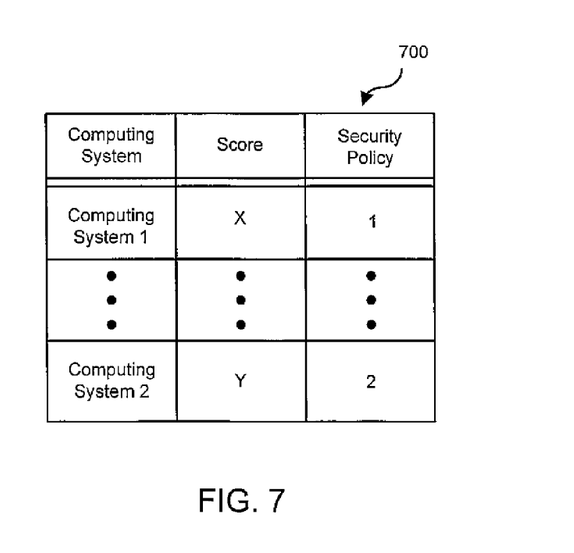
FIG. 7 is an example of a table containing information related to users and security scores.

As mentioned above, prior access requests of a user may be used to determine future security policies that are to be applied when the user requests access to a network site. In one embodiment, a score is developed for each user that indicates the propensity for that user to request access to network sites that contain undesirable content. Such a score may be a percentage of access requests to network sites that have restricted content, a ratio of access requests to unrestricted versus restricted network sites, frequency of access requests to sites that have restricted content, a weighted average of recent versus older access requests, among others. In one embodiment, the score is a simple percentage of access requests to restricted sites as a percent of total access requests. A security profile or policy for a user is then determined based on the score of the user. For example, if a user has a good score, indicating that the particular user has very few, if any, access requests to restricted network sites, that user will have a security policy that allows the user to access network sites that may not have been classified with respect to security risks posed by the site. More specifically, if a user requests access to a network site that has not been classified by a security company as containing, or not containing, undesirable content, a user with a good score will be permitted to access the site, and a second user with a bad score will be warned that the site may contain undesirable content, or the second user may be denied access to the site. Security policies may be set to allow free access, provide a warning, or deny access, for example. FIG. 7 is an example of a table 700 that may be stored in memory that provides information related to different users, the score for the users, and a security policy that is to be applied for the user. As will be understood, table 700 is provided for the purposes of illustration and discussion only, and the information stored in the table 700 may be stored in any of a number of different formats and/or structures as will be readily understood by one of skill in the art. Furthermore, other formats and/or structures may include different, additional, or less information than stored in table 700.

Figure 8:
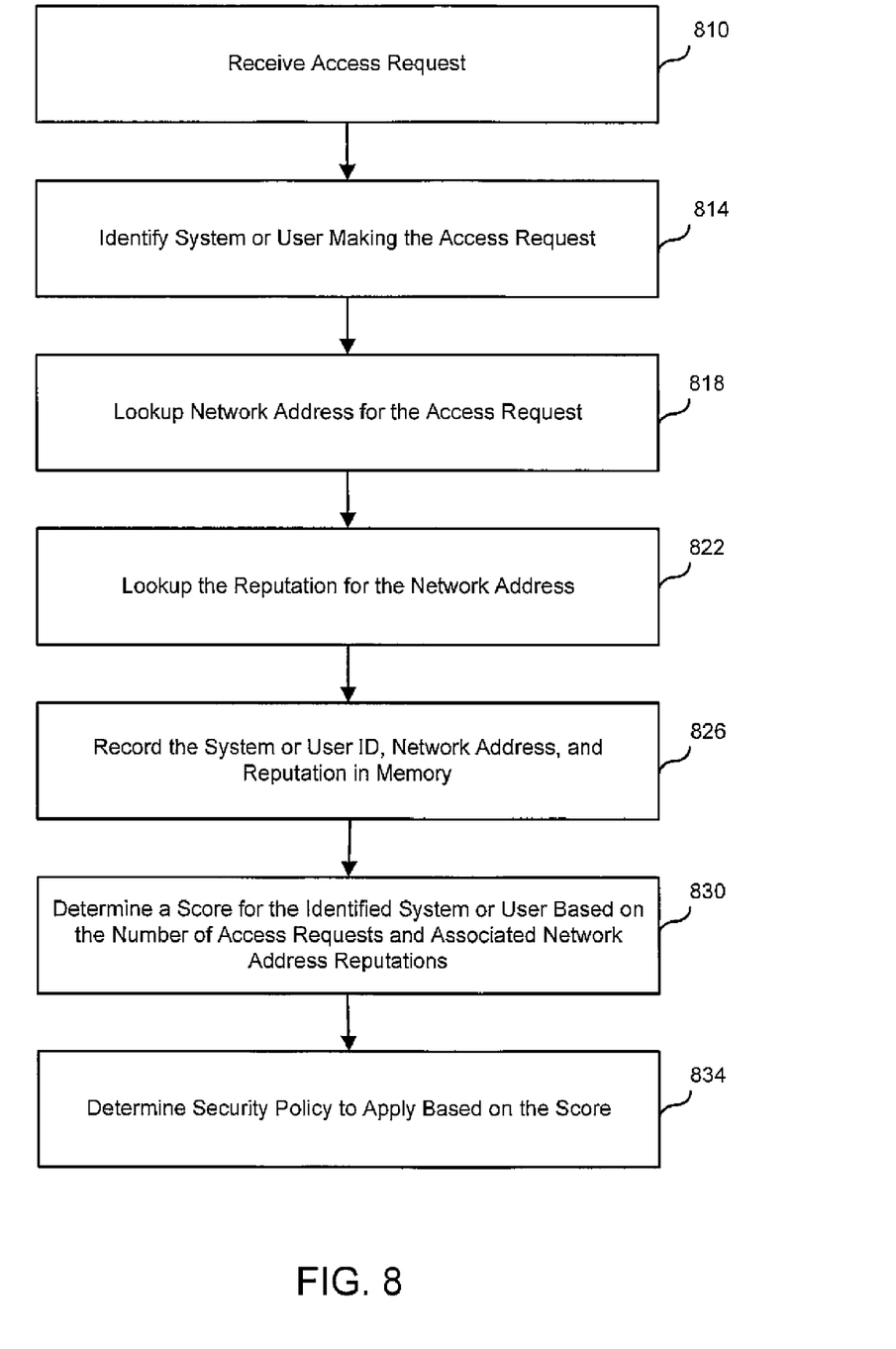
FIG. 8 is an illustration of the operations of a processor of an exemplary embodiment.

With reference now to FIG. 8, the operations of an exemplary embodiment for determining a security policy are described. In this embodiment, an access request is received, as indicated at block 810. At block 814, the system, or user, making the access request is identified. The network address, such as IP address, is looked up for the site requested in the access request, according to block 818. The reputation for the network address is then looked up at block 822. The reputation for the network address may be related to a security policy for the network address, such as a restricted site. Site reputation may be determined based on information provided by a security company that, for example, provides periodic updates related to sites that contain undesirable or questionable content. At block 826, information is recorded indicating the system or user identification, the requested network address, and the reputation of the requested address. As discussed above, this information may be recorded in the memory of a name server, in a storage server connected through a network to a name server, or database connected through a network to a name server, to name but a few examples. At block 830, a score is determined for the identified user or system based on the number of access requests and associated network address reputations. As discussed above, the score may be a percentage of access requests from a user to sites that have undesirable content, or some other type of indication related to the likelihood that the user may access a site that contains undesirable content. Finally, at block 834, a security policy is determines and applied to the access request based on the score. The operations of FIG. 8 may be performed, for example, by a processor in a name server, or by a system or processor that is remote to the name server.

Figure 9:
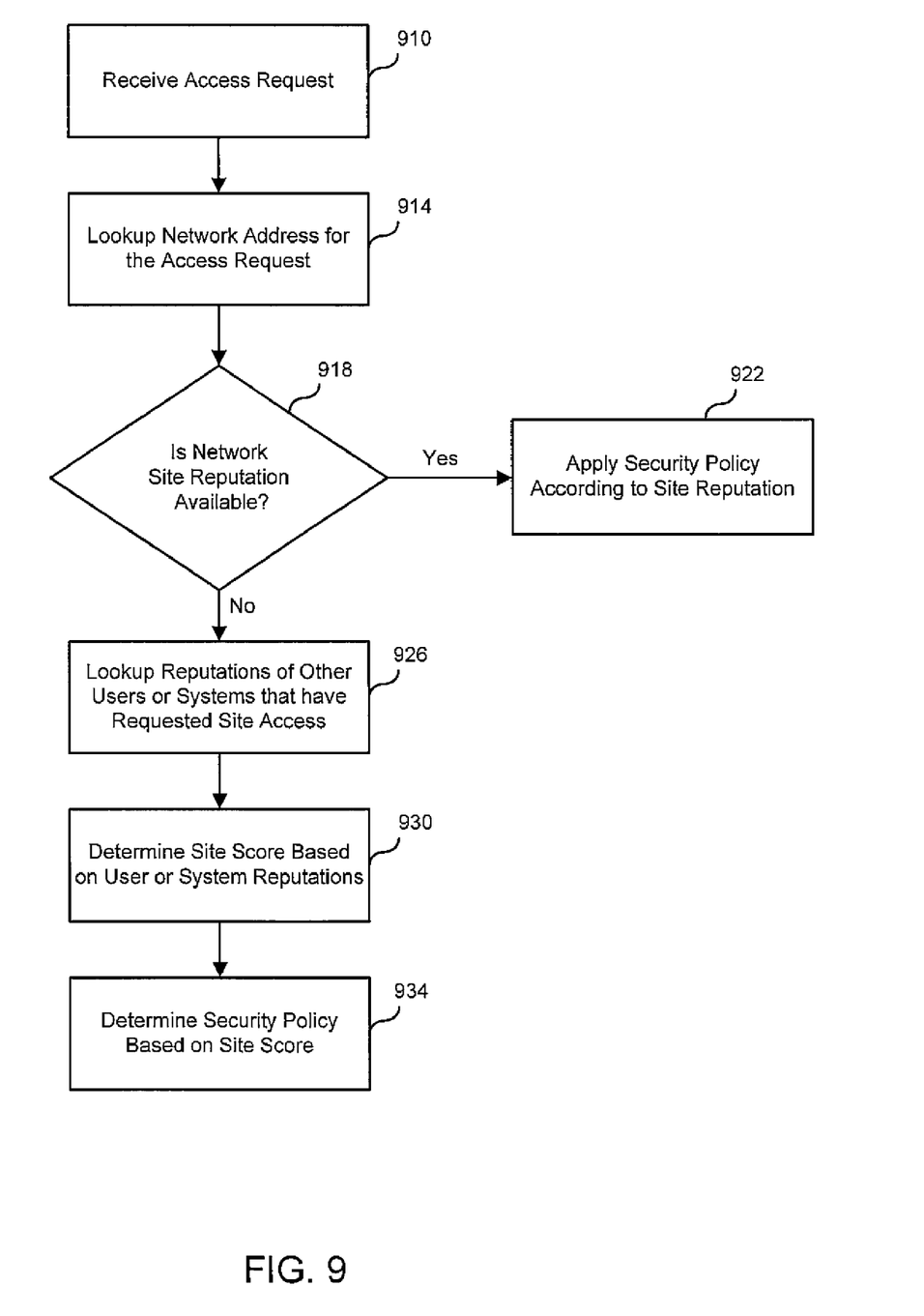
FIG. 9 is an illustration of the operations of a processor of another exemplary embodiment.

With reference now to FIG. 9, the operations for determining a security policy for an access request for another exemplary embodiment are described. In this embodiment, an access request is received, as indicated at block 910. At block 914, the network address is looked up to determine a physical address for the network site contained in the access request. It is determined, at block 918, if a reputation for the requested network site is available, that is, if the particular site has or has not been classified relative to a security threat that the site may pose. If a reputation for the site is available, a security policy for the site is set according to the reputation, as indicated at block 922. If a reputation for the site is not available, the reputations of other users or systems that have requested access to the site is determined, as noted at block 926. More specifically, the address for the site is searched to determine if any other users or systems have requested access to the site, and if to the reputation for the associated users or systems is determined based on a score for the user or system. Such a score may be determined as described above, for example. At block 930, a site score is determined based on the user or system reputations that were looked up at block 926. Finally, at block 934, a security policy for the site is determined base on the site score. For example, if access has been requested for a particular site from users or systems that have relatively poor reputations related to requesting access to restricted sites, a security policy may be set that provides a warning to a user before granting access to the site, or access to the site may be denied. Furthermore, the reputation for the user may also be used in determining a security policy for accessing the site.

Figure 10:
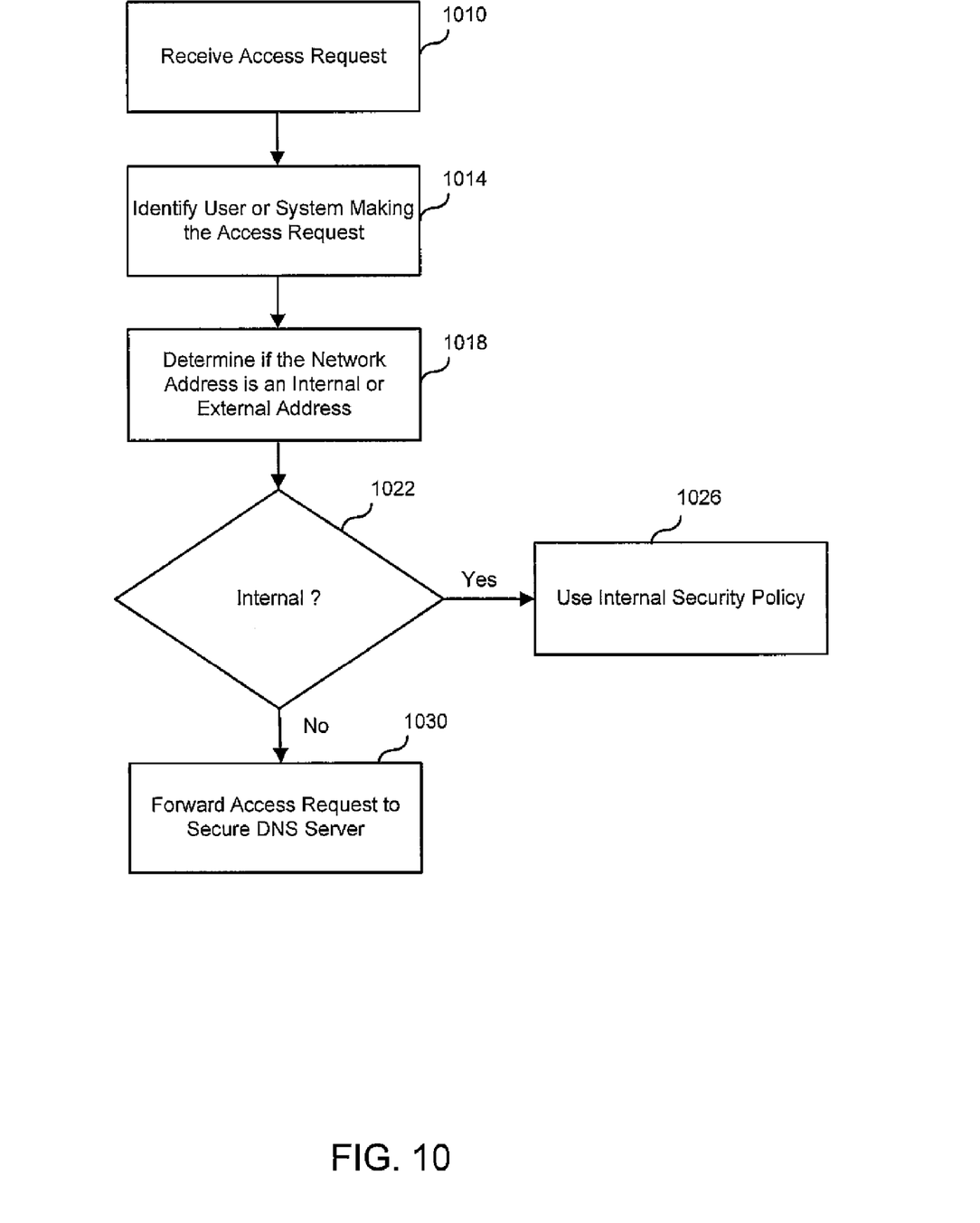
FIG. 10 is an illustration of the operations of a processor of another exemplary embodiment.

With reference now to FIG. 10, the operations for an enterprise name server of an exemplary embodiment are described. An enterprise name server, such as illustrated in FIG. 2, may provide physical network addresses for enterprise sites. In this embodiment, an enterprise server receives a request to access a site, as noted at block 1010. At block 1014, the enterprise server identifies the user or system that is making the access request. It is determined, at block 1018, if the address for the requested site is an address that is internal to the enterprise. If the address is internal at block 1022, an internal security policy is applied to the access request as indicated at block 1026. If the requested site is not an enterprise site, the enterprise name server forwards the access request to a secure name server, as noted at block 1030. The secure name server may then apply security settings or policies according to any appropriate operations, such as described in the above embodiments.

Figure 11:
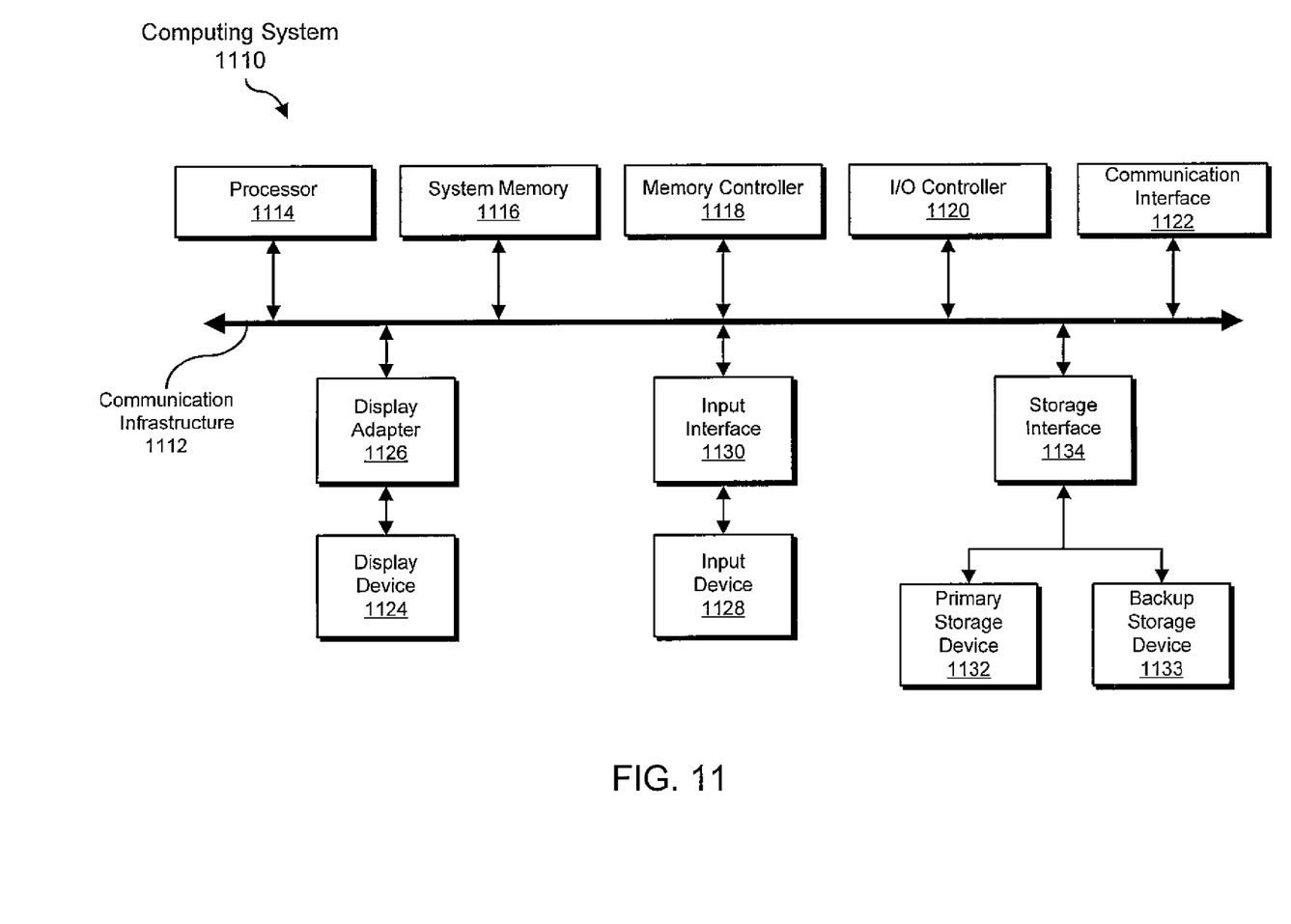
FIG. 11 is a functional block diagram of an exemplary computing system.

While many of the above embodiments are described with respect to a name server, other embodiments may use a separate computing system to determine appropriate security policies that may be applied to various network site access requests. FIG. 11 is a block diagram of an exemplary computing system 1110 capable of implementing one or more of the embodiments described and/or illustrated herein. Computing system 1110 broadly represents any single or multi-processor computing device or system capable of executing computer-readable instructions. Examples of computing system 1110 include, without limitation, workstations, laptops, client-side terminals, servers, distributed computing systems, handheld devices, or any other computing system or device. In its most basic configuration, computing system 1110 may comprise at least one processor 1114 and a system memory 1116.

Processor 1114 generally represents any type or form of processing unit capable of processing data or interpreting and executing instructions. In certain embodiments, processor 1114 may receive instructions from a software application or module. These instructions may cause processor 1114 to perform the functions of one or more of the exemplary embodiments described and/or illustrated herein. For example, processor 1114 may perform and/or be a means for performing, either alone or in combination with other elements, one or more of the identifying, determining, creating, storing, locating, restoring, copying, comparing, and retrieving steps described herein. Processor 1114 may also perform and/or be a means for performing any other steps, methods, or processes described and/or illustrated herein.

System memory 1116 generally represents any type or form of volatile or non-volatile storage device or medium capable of storing data and/or other computer-readable instructions. Examples of system memory 1116 include, without limitation, random access memory (RAM), read only memory (ROM), flash memory, or any other suitable memory device. Although not required, in certain embodiments computing device 1110 may comprise both a volatile memory unit (such as, for example, system memory 1116) and a non-volatile storage device (such as, for example, primary storage device 1132, as described in detail below).

In certain embodiments, exemplary computing system 1110 may also comprise one or more components or elements in addition to processor 1114 and system memory 1116. For example, as illustrated in FIG. 11, computing system 1110 may comprise a memory controller 1118, an Input/Output (I/O) controller 1118, and a communication interface 1122, each of which may be interconnected via a communication infrastructure 1112. Communication infrastructure 1112 generally represents any type or form of infrastructure capable of facilitating communication between one or more components of a computing device. Examples of communication infrastructure 1112 include, without limitation, a communication bus (such as an ISA, PCI, PCIe, or similar bus) and a network.

Memory controller 1118 generally represents any type or form of device capable of handling memory or data or controlling communication between one or more components of computing system 1110. For example, in certain embodiments memory controller 1118 may control communication between processor 1114, system memory 1116, and I/O controller 1120 via communication infrastructure 1112. In certain embodiments, memory controller may perform and/or be a means for performing, either alone or in combination with other elements, one or more of the steps or features described and/or illustrated herein, such as identifying, determining, creating, storing, locating, restoring, copying, comparing, and retrieving.

I/O controller 1120 generally represents any type or form of module capable of coordinating and/or controlling the input and output functions of a computing device. For example, in certain embodiments I/O controller may control or facilitate transfer of data between one or more elements of computing system 1110, such as processor 1114, system memory 1116, communication interface 1122, display adapter 1126, input interface 1130, and storage interface 1134. I/O controller 1120 may be used, for example, to perform and/or be a means for performing, either alone or in combination with other elements, one or more of the identifying, determining, creating, storing, locating, restoring, copying, comparing, and retrieving steps described herein. I/O controller 1120 may also be used to perform and/or be a means for performing other steps and features set forth in the instant disclosure.

Communication interface 1122 broadly represents any type or form of communication device or adapter capable of facilitating communication between exemplary computing system 1110 and one or more additional devices. For example, in certain embodiments communication interface 1122 may facilitate communication between computing system 1110 and a private or public network comprising additional computing systems. Examples of communication interface 1122 include, without limitation, a wired network interface (such as a network interface card), a wireless network interface (such as a wireless network interface card), a modem, and any other suitable interface. In at least one embodiment, communication interface 1122 may provide a direct connection to a remote server via a direct link to a network, such as the Internet. Communication interface 1122 may also indirectly provide such a connection through, for example, a local area network (such as an Ethernet network), a personal area network (such as a BLUETOOTH network), a telephone or cable network, a cellular telephone connection, a satellite data connection, or any other suitable connection.

In certain embodiments, communication interface 1122 may also represent a host adapter configured to facilitate communication between computing system 1110 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 1122 may also allow computing system 1110 to engage in distributed or remote computing. For example, communication interface 1122 may receive instructions from a remote device or send instructions to a remote device for execution. In certain embodiments, communication interface 1122 may perform and/or be a means for performing, either alone or in combination with other elements, one or more of the identifying, determining, creating, storing, locating, restoring, copying, comparing, and retrieving steps disclosed herein. Communication interface 1122 may also be used to perform and/or be a means for performing other steps and features set forth in the instant disclosure.

As illustrated in FIG. 11, computing system 1110 may also comprise at least one display device 1124 coupled to communication infrastructure 1112 via a display adapter 1126. Display device 1124 generally represents any type or form of device capable of visually displaying information forwarded by display adapter 1126. Similarly, display adapter 1126 generally represents any type or form of device configured to forward graphics, text, and other data from communication infrastructure 1112 (or from a frame buffer, as known in the art) for display on display device 1124.

As illustrated in FIG. 11, exemplary computing system 1110 may also comprise at least one input device 1128 coupled to communication infrastructure 1112 via an input interface 1130. Input device 1128 generally represents any type or form of input device capable of providing input, either computer or human generated, to exemplary computing system 1110. Examples of input device 1128 include, without limitation, a keyboard, a pointing device, a speech recognition device, or any other input device. In at least one embodiment, input device 1128 may perform and/or be a means for performing, either alone or in combination with other elements, one or more of the identifying, determining, creating, storing, locating, restoring, copying, comparing, and retrieving steps disclosed herein. Input device 1128 may also be used to perform and/or be a means for performing other steps and features set forth in the instant disclosure.

As illustrated in FIG. 11, exemplary computing system 1110 may also comprise a primary storage device 1132 and a backup storage device 1133 coupled to communication infrastructure 1112 via a storage interface 1138. Storage devices 1132 and 1133 generally represent any type or form of storage device or medium capable of storing data and/or other computer-readable instructions. For example, storage devices 1132 and 1133 may be a magnetic disk drive (e.g., a so-called hard drive), a floppy disk drive, a magnetic tape drive, an optical disk drive, a flash drive, or the like. Storage interface 1138 generally represents any type or form of interface or device for transferring data between storage devices 1132 and 1133 and other components of computing system 1110.

In certain embodiments, storage devices 1132 and 1133 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1132 and 1133 may also comprise other similar structures or devices for allowing computer software, data, or other computer-readable instructions to be loaded into computing system 1110. For example, storage devices 1132 and 1133 may be configured to read and write software, data, or other computer-readable information. Storage devices 1132 and 1133 may also be a part of computing system 1110 or may be a separate device accessed through other interface systems.

In certain embodiments, the exemplary file systems disclosed herein may be stored on primary storage device 1132, while the exemplary file-system backups disclosed herein may be stored on backup storage device 1133. Storage devices 1132 and 1133 may also be used, for example, to perform and/or be a means for performing, either alone or in combination with other elements, one or more of the identifying, determining, creating, storing, locating, restoring, copying, comparing, and retrieving steps disclosed herein. Storage devices 1132 and 1133 may also be used to perform and/or be a means for performing other steps and features set forth in the instant disclosure.

Many other devices or subsystems may be connected to computing system 1110. Conversely, all of the components and devices illustrated in FIG. 11 need not be present to practice the embodiments descried and/or illustrated herein. The devices and subsystems referenced above may also be interconnected in different ways from that shown in FIG. 11. Computing system 1110 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include recordable media (such as floppy disks and CD- or DVD-ROMs), transmission-type media (such as carrier waves), electronic-storage media, magnetic-storage media, optical-storage media, and other distribution systems.

The computer-readable medium containing the computer program may then be loaded into computing system 1110. All or a portion of the computer program stored on the computer-readable medium may then be stored in system memory 1116 and/or various portions of storage devices 1132 and 1133. When executed by processor 1114, a computer program loaded into computing system 1110 may cause processor 1114 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 1110 may be configured as an application specific integrated circuit (ASIC) adapted to implement one or more of the exemplary embodiments disclosed herein.

Those of skill will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in software, the various functions described herein may be stored on or transmitted over as one or more instructions or code on a computer-readable medium. Computer-readable media includes both computer storage media and communication media including any medium that facilitates transfer of a computer program from one place to another. A storage media may be any a media that can be accessed by a computer. By way of example, such computer-readable media can comprise volatile or non-volatile storage media including RAM, ROM, EEPROM, CD-ROM or other optical disk storage, magnetic disk storage or other magnetic storage devices, or any other medium that can be used to carry or store desired program code in the form of instructions or data structures and that can be accessed/executed by a computer. Also, any connection is properly termed a computer-readable medium. For example, software may be transmitted from a website, server, or other remote source using any combination of a coaxial cable, fiber optic cable, twisted pair, digital subscriber line (DSL), or wireless technologies such as infrared, radio, and microwave. Combinations of the above are also included within the scope of computer-readable media.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A network access gateway, comprising:
   a network interface that receives a request to access a network site from a first user that is remote to a network server;
   a processor that determines the requested network site has not been assigned a security risk classification and that the first user is requesting access to the requested network site for a first time;
   a memory that stores user information related to security risks of network sites to which a particular user has previously requested access, wherein the user information comprises a number of times the first user has previously requested to access each of the network sites;
   a database in the memory, wherein the database includes a reputation score for the first user and one or more additional users, wherein the reputation score is determined based on a number of access requests to network sites that have been previously identified as security risks;
   the processor further accesses the memory when access to the network site is requested for the first time, and based on the reputation scores for the first user and the one or more additional users, selects a security profile that is to be applied to the access request; and
   the processor further restricts access to the network site with an unknown security risk when a frequency of access requests to network sites identified as security risks is above a threshold.

2. The network access gateway, as claimed in claim 1, wherein the memory comprises:
   a database of access requests from a plurality of users and information related to the security risks of network sites to which each user has previously requested access.

3. The network access gateway, as claimed in claim 1, wherein the processor selects the security profile according to a frequency of access requests from the user to network sites that are identified as security risks.

4. The network access gateway, as claimed in claim 1, wherein the processor generates a notification when a predetermined number of access requests are received for a network site that is not classified for security risk.

5. A method for selecting a security profile to apply to a request to access a network site, comprising:
   receiving an access request to access a network site from a remote computing system;
   identifying a user ID associated with the access request;
   determining if the network site has been classified according to a security risk for the site;
   determining whether the user ID associated with the access request has previously gained access to the network site;
   when the network site has been classified, recording the user ID, network site, and security risk in a memory; and
   when the network site has not been classified and when the user ID associated with the access request is requesting access to the network site for a first time:
      identifying a prior access request associated with the user ID to access one or more additional network sites;
      identifying at least one additional user ID associated with a prior access request to access the network site;
      identifying a reputation score for the at least one additional user ID associated with the prior access request to access the network site and for the user ID associated with the prior access request to access the one or more additional network sites, wherein the reputation score is determined based on a number of access requests to network sites that have been previously identified as security risks;
      identifying a security profile for the network site based on the identified reputation score for the user ID and the reputation score for the at least one additional user ID.

6. The method, as claimed in claim 5, wherein receiving an access request comprises:
   receiving a request to access a network site that is external to an enterprise from an enterprise network access gateway.

7. The method, as claimed in claim 5, wherein identifying a user ID comprises:
   determining a network address of the remote computing system; and
   identifying the user ID of a user actively logged on to the remote computing system for that instance of the network address.

8. The method, as claimed in claim 5, wherein determining if the network site has been classified comprises:
   identifying a network address of the network site;
   accessing a memory of classified network sites; and
   determining if the identified network address has been classified.

9. The method, as claimed in claim 5, wherein when the identified network address is not classified for security purposes, determining that the network address is not a potential security risk when prior access requests associated with the user ID have not requested access to network sites that are security risks.

10. The method, as claimed in claim 5, wherein recording the user ID, network site, and security risk comprises:

accessing a database that contains records of user IDs, access requests made by the user ID, and security risks associated with the access requests; and updating the database record for the user ID with the access request and security risk.

11. A non-transitory computer readable medium containing instructions, that when executed by a computer, cause the computer to perform operations comprising:

receiving an access request to access a network site from a remote computing system;

identifying a user ID associated with the access request;

determining if the network site has been classified according to a security risk for the site;

determining whether the user ID associated with the access request has previously gained access to the network site;

when the network site has been classified, recording the user ID, network site, and security risk in a memory; and when the network site has not been classified and when the user ID associated with the access request is requesting access to the network site for a first time:

identifying a prior access request associated with the user ID to access one or more additional network sites;

identifying at least one additional user ID associated with a prior access request to access the network site;

identifying a reputation score for the at least one additional user ID associated with the prior access request to access the network site and for the user ID associated with the prior access request to access the one or more additional network sites, wherein the reputation score is determined based on a number of access requests to network sites that have been previously identified as security risks;

identifying a security profile for the network site based on the identified reputation score for the user ID and the reputation score for the at least one additional user ID.

12. The computer readable medium, as claimed in claim 11, wherein receiving an access request comprises:

receiving a request to access a network site that is external to an enterprise from an enterprise network access gateway.

13. The computer readable medium, as claimed in claim 11, wherein identifying a user ID comprises:

determining a network address of the remote computing system; and identifying the user ID of a user actively logged on to the remote computing system for that instance of the network address.

14. The computer readable medium, as claimed in claim 11, wherein when the identified network address is not classified for security purposes, determining that the network address is not a potential security risk when prior access requests associated with the user ID have not requested access to network sites that are security risks.

15. The computer readable medium, as claimed in claim 11, wherein recording the user ID, network site, and security risk comprises:

accessing a database that contains records of user IDs, access requests made by the user ID, and security risks associated with the access requests; and updating the database record for the user ID with the access request and security risk.

* * * * *